(12) United States Patent
Kieffer (10) Patent No.: US 11,618,953 B2
(45) Date of Patent: Apr. 4, 2023

(54) SYSTEM FOR LASER-DRIVEN IMPACT ACCELERATION

(71) Applicant: INSTITUT NATIONAL DE LA RECHERCHE SCIENTIFIQUE, Québec (CA)

(72) Inventor: Jean-Claude Kieffer, Montréal (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 20 days.

(21) Appl. No.: 17/303,940

(22) Filed: Jun. 10, 2021

(65) Prior Publication Data

US 2021/0292909 A1   Sep. 23, 2021

Related U.S. Application Data

(62) Division of application No. 16/461,686, filed as application No. PCT/CA2017/050991 on Aug. 22, 2017, now Pat. No. 11,060,193.

(60) Provisional application No. 62/425,924, filed on Nov. 23, 2016.

(51) Int. Cl.
   *C23C 24/08*   (2006.01)
   *B23K 26/18*   (2006.01)

(52) U.S. Cl.
   CPC ............ *C23C 24/087* (2013.01); *B23K 26/18* (2013.01)

(58) Field of Classification Search
   CPC ............................... C23C 24/087; B23K 26/18
   USPC .......................... 219/121.61, 121.63, 121.68
   See application file for complete search history.

(56) References Cited

U.S. PATENT DOCUMENTS

| | | | | |
|---|---|---|---|---|
| 3,964,389 A | * | 6/1976 | Peterson | ............... B41C 1/1091 430/302 |
| 4,752,455 A | * | 6/1988 | Mayer | .................... B23K 20/08 219/121.6 |
| 4,895,735 A | * | 1/1990 | Cook | .................... C23C 14/048 257/E21.333 |
| 4,987,006 A | * | 1/1991 | Williams | ............... H05K 3/046 427/98.5 |
| 5,173,441 A | * | 12/1992 | Yu | ........................... C23C 14/28 430/315 |
| 5,292,559 A | * | 3/1994 | Joyce, Jr. | ................ C23C 26/00 427/124 |

(Continued)

FOREIGN PATENT DOCUMENTS

| | | |
|---|---|---|
| JP | 4001740 | 10/2007 |
| WO | 2013039609 | 3/2013 |

OTHER PUBLICATIONS

International Search Report—PCT/CA2017/050991, dated Nov. 22, 2017.

(Continued)

*Primary Examiner* — Jimmy Chou
(74) *Attorney, Agent, or Firm* — Gwendoline Bruneau; Lavery, De Billy, LLP (57) ABSTRACT

A system for laser-driven propulsion, system comprising a laser source and a target comprising an accelerating part and a projectile part, the accelerating part comprising a metal layer and a porous layer pressed against the metal layer; wherein the laser source is selected to emit pulse beams directed to the metal layer at a fluence below the plasma ablation threshold of the material of the metal layer.

10 Claims, 9 Drawing Sheets

(56) References Cited

U.S. PATENT DOCUMENTS

| | | | | |
|---|---|---|---|---|
| 5,683,601 A * | 11/1997 | Tatah | | C23C 14/28 427/469 |
| 5,725,989 A | 3/1998 | Chang | | |
| 6,159,832 A * | 12/2000 | Mayer | | H01L 21/2855 438/584 |
| 6,177,151 B1 * | 1/2001 | Chrisey | | C23C 14/048 219/121.85 |
| 6,180,912 B1 * | 1/2001 | Tatah | | C23C 14/28 219/121.77 |
| 6,194,347 B1 | 2/2001 | Narita | | |
| 6,270,944 B1 | 8/2001 | Wolk | | |
| 6,530,212 B1 | 3/2003 | Phipps | | |
| 6,583,381 B1 * | 6/2003 | Duignan | | B23K 15/002 219/121.72 |
| 6,766,764 B1 * | 7/2004 | Chrisey | | C23C 14/048 427/404 |
| 6,815,015 B2 * | 11/2004 | Young | | C23C 14/048 506/40 |
| 6,822,189 B2 * | 11/2004 | Hong | | C03C 23/0025 427/596 |
| 6,862,490 B1 * | 3/2005 | Duignan | | H01L 21/67028 700/121 |
| 6,905,738 B2 * | 6/2005 | Ringeisen | | H05K 3/046 427/595 |
| 6,936,311 B2 * | 8/2005 | Ringeisen | | C23C 14/28 427/595 |
| 7,294,367 B2 * | 11/2007 | Barron | | C12N 13/00 427/595 |
| 7,641,150 B2 * | 1/2010 | Kuninaka | | F03H 1/0012 244/171.1 |
| 7,744,770 B2 * | 6/2010 | Doi | | H01L 21/6835 216/60 |
| 7,943,287 B2 * | 5/2011 | Yamazaki | | H01L 27/124 445/24 |
| 7,994,021 B2 * | 8/2011 | Miyairi | | H01L 27/1288 438/455 |
| 8,663,754 B2 * | 3/2014 | Liu | | C23C 20/04 427/520 |
| 8,728,589 B2 * | 5/2014 | Auyeung | | C23C 14/28 427/595 |
| 8,840,972 B2 * | 9/2014 | Yamazaki | | C23C 14/048 427/596 |
| 9,021,782 B1 * | 5/2015 | Campbell | | G21D 5/02 60/203.1 |
| 9,859,247 B2 * | 1/2018 | Smits | | B23K 35/262 |
| 10,144,034 B2 * | 12/2018 | Zenou | | B29C 64/106 |
| 10,193,004 B2 * | 1/2019 | Zenou | | C23C 14/28 |
| 10,471,538 B2 * | 11/2019 | Zenou | | B23K 26/57 |
| 10,629,442 B2 * | 4/2020 | Zenou | | B41M 5/025 |
| 10,633,758 B2 * | 4/2020 | Kotler | | B33Y 10/00 |
| 10,688,692 B2 * | 6/2020 | Zenou | | G03F 7/0002 |
| 10,799,984 B2 * | 10/2020 | Zenou | | B23K 26/146 |
| 10,899,154 B2 * | 1/2021 | Krumbholz | | B22F 10/47 |
| 11,060,193 B2 * | 7/2021 | Kieffer | | B23K 26/18 |
| 11,387,384 B2 * | 7/2022 | Park | | H01L 33/24 |
| 2003/0178395 A1 * | 9/2003 | Duignan | | C23C 14/048 219/121.61 |
| 2004/0140296 A1 | 7/2004 | Lis | | H01M 4/92 219/121.61 |
| 2005/0056625 A1 * | 3/2005 | Haight | | B23K 26/361 219/121.73 |
| 2008/0038487 A1 * | 2/2008 | Barron | | B41M 5/38207 427/596 |
| 2008/0314881 A1 * | 12/2008 | Ringeisen | | B23K 26/009 219/121.68 |
| 2008/0318030 A1 * | 12/2008 | Handy | | H01L 21/6835 428/354 |
| 2009/0074987 A1 * | 3/2009 | Auyeung | | C23C 14/28 427/596 |
| 2011/0302906 A1 * | 12/2011 | Sinko | | B64G 1/409 60/204 |
| 2012/0080088 A1 * | 4/2012 | Grabitz | | H01L 31/022425 257/E31.127 |
| 2013/0180969 A1 * | 7/2013 | Cheng | | B23K 26/356 219/121.85 |
| 2015/0097316 A1 * | 4/2015 | DeSimone | | A61F 2/82 264/401 |
| 2015/0224291 A1 * | 8/2015 | Guillemot | | C12M 21/08 604/290 |
| 2016/0233089 A1 * | 8/2016 | Zenou | | H01L 21/02601 |
| 2017/0028618 A1 * | 2/2017 | Robeson | | B33Y 10/00 |
| 2017/0110623 A1 * | 4/2017 | Carlson | | H01L 31/022441 |
| 2017/0189995 A1 * | 7/2017 | Zenou | | H05K 3/18 |
| 2017/0250294 A1 * | 8/2017 | Zenou | | B23K 26/0861 |
| 2018/0193948 A1 * | 7/2018 | Zenou | | C23C 14/225 |

OTHER PUBLICATIONS

Anderholm, N.C., Laser-Generated Stress Waves, Appl. Phys. Lett. 16, 113 (1970).

ASM Handbook, vol. 5A, Thermal spray technology, ASM international (2013).

Champagne, V. et al., The effect of cold spray impact velocity on deposit hardness, Modelling Simul. Mater. Sci. Eng. 18 065011 (8pp) doi:10.1088/0965-0393/18/6/065011 (2010).

Darquey, P. et al., in Shock wave and high strain rate phenomena in materials, M. Meyers, L. Murr, K. Staudhammer eds, Marcel Dekker, Inc. (1992).

Fabbro, R. et al., Physical study of laser-produced plasma in confined geometry, J. appl. Phys. 68, 775-784 (1990).

Goela, J.S. and Green, B.D., Ablative acceleration of small particles to high velocity by focused laser radiation, JOSA B, 3, 8-14 (1986).

Kadono, T. et al., Impact experiments with a new technique for acceleration of projectiles to velocities higher than earth escape velocity of 11.2km/s, J. of Geophysical research, 115, E04003, 9 pages (2010).

Kadono, T. et al., Flyer acceleration by high-power laser and impact experiments at velocities higher than 10 km/s; Shock Compression of Condensed Matter—2011, AIP Conf. Proc. 1426, 847-850 (2012); doi: 10.1063/1.3686410 American Institute of Physics 978-0-7354-1006-0/$0.00 (2012).

Katz, S. et al., Response of composite materials to hypervelocity impact, Int. Journal. of Impact Engineering, 35, 1606-1611 (2008).

Kieffer, J-C. et al., Absorption of an Ultrashort Laser Pulse in Very Steep Plasma Density Gradients, IEEE J. Quantum Electronics 25, 2640 (1989).

Kovaleva, I. et al., Simulation of Light-Propulsion Acceleration of Powder Particles for Laser Direct Metal Deposition, Physics Procedia 12, 285-295 (2011).

Phipps, C. et al., Review: Laser-Ablation Propulsion, J. Prop. Power 26, 609 (2010) and references therein.

Sanner, N. et al., Towards determinism in surface damaging of dielectrics using few cycle laser pulses, Appl. Phys. Lett. 96, 071111 (2010).

Uteza, O. et al., Surface ablation of dielectrics using sub10fs to 300fs laser pulses : crater depth and efficiency as a function of the laser intensity. Journal of Laser Micro-NanoEngineering, 5, 3 (2010).

Zhang, N. et al., Investigation of ultrashort pulse laser ablation of solid targets by measuring the ablation generated momentum using a torsion pendulum, Optics express, 19, 8870-8878 (2011).

* cited by examiner

FIG_3

SYSTEM FOR LASER-DRIVEN IMPACT ACCELERATION

CROSS REFERENCE TO RELATED APPLICATIONS

This application is a divisional application of U.S. patent application Ser. No. 16/461,686, allowed on Apr. 22, 2021, and is a National Entry Application of PCT application Serial No PCT/CA2017/050991, filed on Aug. 22, 2017 and published in English under PCT Article 21(2), which itself claims benefit of U.S. provisional application Ser. No. 62/425,924, filed on Nov. 23, 2016. All documents above are incorporated herein in their entirety by reference.

FIELD OF THE INVENTION

The present invention relates to laser-driven propulsion. More specifically, the present invention is concerned with a system for laser-driven propulsion of projectiles.

BACKGROUND OF THE INVENTION

Accelerated masses of cold and hot solids are used in various applications related to material science, including surface coating, blasting, hardening and impact initiation of detonation for instance.

In material deposition processes, small particles are accelerated to high velocities and subsequently impacted on a surface to produce a coating or some other desired process. In a conventional method, a powder of particles is accelerated by injection in a high velocity gas stream [1, 2]. Lasers have been combined to particle transportation in gas flow to increase the particle velocity [3].

Direct laser-driven propulsion of projectiles, including small particles, has been demonstrated and studied with lasers generating pulses from femtosecond duration with high repetition rate to nanosecond duration with large energy per pulse. High-speed ballistic propulsion of a projectile by a laser is based on plasma generation, depending of the laser fluence on the projectile, and subsequent recoil force or ablation propulsion.

Methods have also been developed, associated to nanosecond laser systems, to increase the coupling between the laser and an accelerated projectile by using layered target confining the vaporized surface or the plasma at the interface between a transparent layer such as water or glass for example and an absorbing back-plate [4]. In these methods, the confinement of the heated area or plasma at the interface maintains the pressure during a time that is longer than the laser pulse duration, increasing the momentum transferred to the target [5, 6, 7]. Momentum transfer larger than 1 Mbar·ns can be produced when the laser fluence at the interface is larger than the ablation threshold, which is around 5 J/cm$^2$ for a nanosecond pulse. Below the ablation threshold, the heated surface still transfers momentum but the effect rapidly decreases when the fluence is decreased. Thus, most practical applications of this method are based on the plasma generation with fluence well above the ablation threshold. This requires the use of large energy laser systems, which have limited repetition rates.

In the present state of the art, a laser-driven propulsion system is based on the generation of plasma to produce efficient ablative acceleration of solid at high velocities in air or in a high vacuum interaction chamber [8]. The system typically comprises a high intensity laser system, either a Ti:Sapphire laser [9] or a CO$_2$ laser [7] or Nb based system [6,7,10,11] with high energy, delivering pulse duration in the femtosecond to nanosecond range, focused by focusing optics on a solid projectile plate positioned at some distance from the focusing optics along the focusing optics axis and, eventually, an impact target positioned at some distance of the projectile.

The system usually requires a surface intensity higher than around 10$^9$ W/cm$^2$ and a fluence above a threshold of around 5 J/cm$^2$ (ablation threshold for metal) for nanosecond pulses. Confined plasma is usually generated at the glass/projectile interface in order to generate high ablation pressure and subsequent momentum transfer. In some experiments, a multilayer target was used with black paint or glue at the interface to increase laser absorption and increase plasma effect [5]. The layer limits the use of shorter pulses due to the lower damage threshold and due to the presence of non-linear effects at shorter pulse duration [1, 13].

When the projectile mass is large compared to the ablated mass, the target velocity v is measured to be proportional to a coupling coefficient $C_m$ and to the laser energy $E_L$ and inversely proportional to the target mass m, as $v = C_m E_L / m$.

Maximum coupling coefficient $C_m$ around 10$^{-3}$N/W has been achieved in confined plasma mode with nanosecond pulses. The transferred momentum saturates when the fluence is increased above 40 J/cm$^2$ due to the breakdown of the transparent window when the laser intensity is too high [7].

This method accelerating thin film of material by the pressure generated by a laser-produced plasma was used for bonding two dissimilar materials [14].

Low coupling coefficient in the 10$^{-5}$ N/W range has been measured in air and no confinement effects, with laser pulses in the femtosecond-picosecond range [15].

There is still a need in the art for a system for laser-driven impact acceleration.

SUMMARY OF THE INVENTION

More specifically, in accordance with the present invention, there is provided a system for laser-driven propulsion comprising a laser source and a target comprising an accelerating part and a projectile part, the accelerating part comprising a metal layer and a porous layer pressed against the metal layer; wherein the laser source is selected to emit pulse beams directed to the metal layer at a fluence below the plasma ablation threshold of the material of the metal layer.

There is further provided a system comprising a target comprising a metal layer; a porous layer and a projectile and a laser source, wherein the laser source is selected to irradiate the metal layer at a fluence below the plasma ablation threshold of the metal layer, thereby generating a pressure wave in the metal layer; the pressure wave propagates and compacts the porous layer, thus creating a cavity; and the cavity, upon cooling and relaxing, enhances momentum transfer to the projectile.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
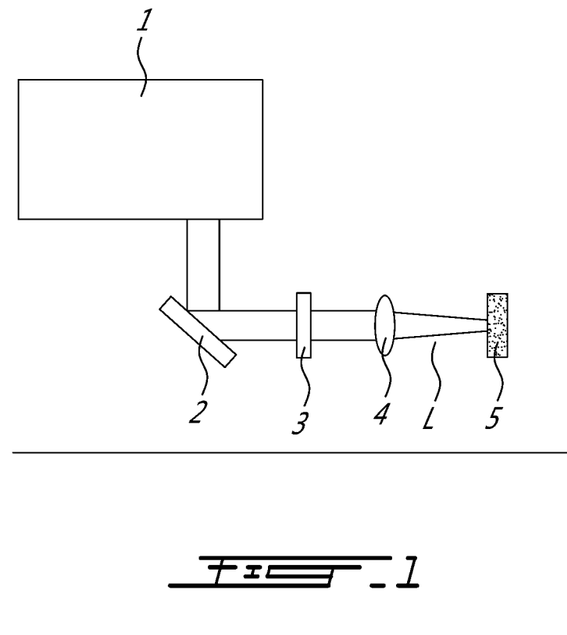
FIG. 1 is a schematic view of a system according to an embodiment of an aspect of the present invention.

A system according to an embodiment of an aspect of the present invention as illustrated in FIG. 1 for example comprises a laser source 1, optics (mirror 2, beam shaper 3 and focusing lens 4), and a target 5.

The laser 1 is selected to emit picosecond to nanosecond pulse beams, with a duration in a range between about 10 µs and about 50 ns. In the examples illustrated in FIGS. 2-5, a beam shaper 3 is used to generate a focal plane flat top laser beam profile. Other profiles may be contemplated (see FIG. 7).

The target 5 comprises a layer of porous, low density, material such as a pre-compacted powder for example. In embodiments illustrated in FIGS. 2 and 3, the target comprises an accelerating part and a projectile 50 to be accelerated. The accelerating part comprises a transparent layer 20, a metal layer 30 in close contact on the rear side of the transparent layer 20, and a layer 40 of pre-compacted powder in close contact with the rear side of the thin metal layer 30. The transparent layer 20 has a thickness in a range between about 500 µm and about 1 cm, the metal layer 30 has a thickness in a range between about 1 µm and about 50 µm, and the layer of pre-compacted powder 40 has a thickness in a range between about 10 µm and about 100 µm.

Figure 2:
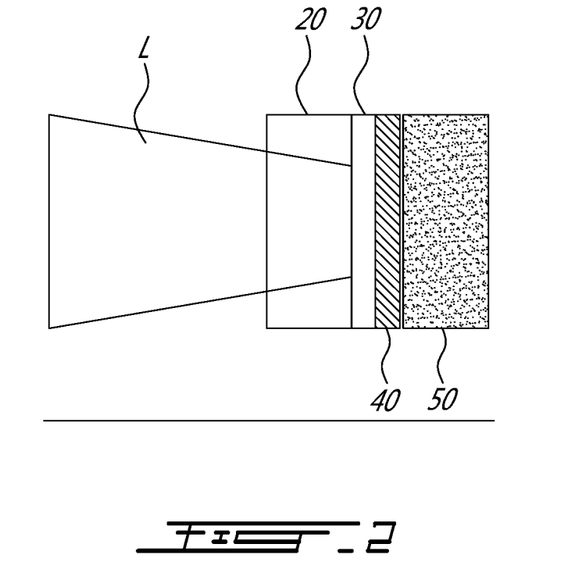
FIG. 2 is a schematic view of a target according to an embodiment of an aspect of the present invention.
Figure 3:
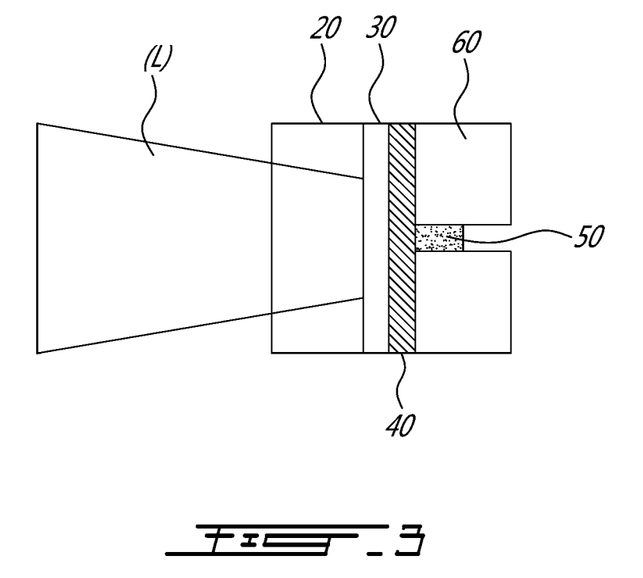
FIG. 3 is a schematic view of a target according to an embodiment of an aspect of the present invention.

The transparent layer 20 is found to confines the laser effect, including absorption, heating and plasma formation for examples, at the surface of the metal layer 30, while restraining its thermal expansion, thereby allowing isochoric heating of the front surface of the metal layer 30 to high electron temperature upon irradiation. The transparent layer 20 may be Plexiglas, glass such as silicate $sio_2$, borosilicate glass BK7 or any other type of high optical quality glasses, for a laser wavelength of 1 µm or less and NaCl for a laser wavelength of 10 µm for example.

As shown in an embodiment illustrated for example in FIG. 3, a projectile support 60 may be used in case of a projectile 50 of a small size, typically of a diameter less than a few hundreds of µm.

In order to ensure a tight contact between the different layers forming the accelerating part of the target 5, a thin, 5 µm thick for example, layer of liquid such as water for example, may be placed at the interfaces between the layers. The projectile 50 is thus pressed against the porous layer 40.

The laser beam (L) propagates through the transparent layer 20 and interacts with the front surface of the metal layer 30 at the interface between the transparent layer 20 and the metal layer 30 at a fluence in a range between about 1 and about 3 J/cm$^2$, below the plasma ablation threshold of the material of the metal layer 30. For example, in the literature, values for single pulse ablation plasma threshold of aluminum are comprised in the range between 4 J/cm$^2$ and 5 J/cm$^2$ for a laser pulse of a wavelength of 1 µm and a pulse duration of a few nanoseconds, typically between about 1 ns and about 5 ns.

Figure 4A:
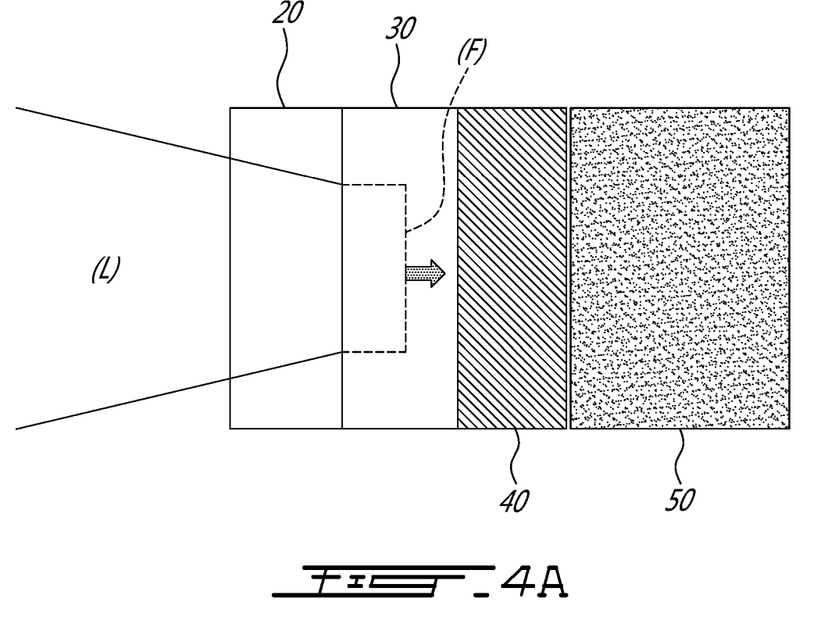
FIG. 4A schematically shows a pressure wave generated according to an embodiment of an aspect of the present invention.
Figure 4B:
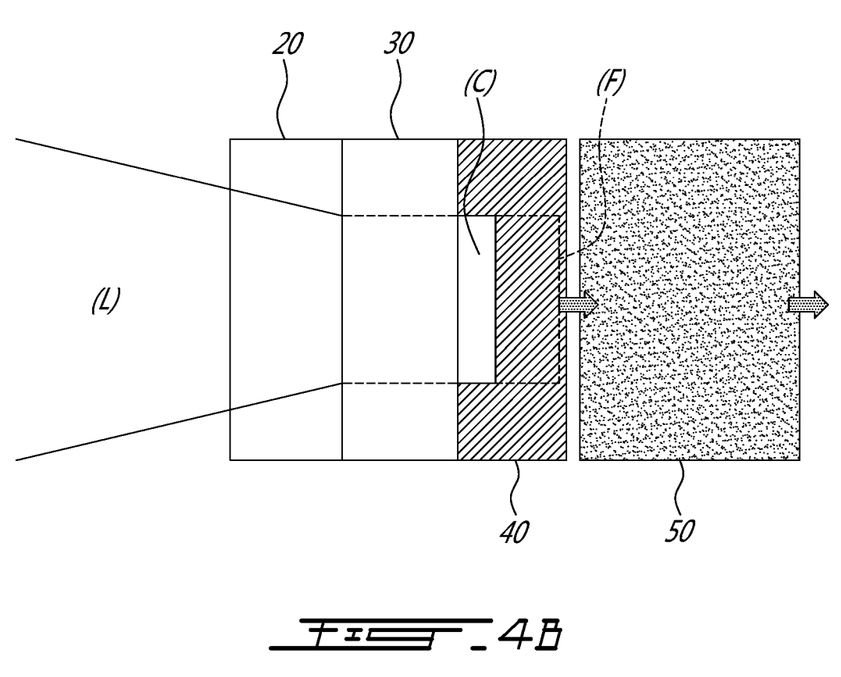
FIG. 4B schematically shows a hot cavity created in the target by the pressure wave of FIG. 4A.

FIGS. 4A and 4B schematically illustrate a sequence of events and effects occurring according to an embodiment of an aspect of the present invention. Below the plasma ablation threshold of the metal layer 30, a large fraction of the laser energy is absorbed at the interface between the transparent layer 20 and the metal layer 30, producing a rapid and isochoric heating of the front surface of the metal layer 30 to high electron temperature. Equilibrium is achieved between the electron and ion temperatures inside the metal layer 30 through electron to ion transfer on a picosecond time scale. The thickness of the metal layer 30 is selected to be about two times the conduction length at the end of the laser pulse (L) so that the generated heat remains localized within the metal layer 30 during the laser pulse (L). As a result, a pressure wave (F) is generated through a thermal process in the metal layer 30 (see stippled lines in FIG. 4A), which propagates and compacts the material of the pre-compacted powder layer 40 (see stippled lines in FIG. 4B).

The pressure wave (F), acting as a piston in the pre-compacted powder layer 40, compacts the powder grains of the re-compacted powder layer 40 forward thus creating a hot cavity (C) (see FIG. 4B). The cavity (C) subsequently expands after the laser pulse through adiabatic cooling and this volume change produces a net momentum well above the initial momentum generated by the laser-matter interaction process at the interface between the transparent layer 20 and the metal layer 30, and which ejects the projectile 50 (see FIG. 4B). No plasma is required and the projectile 50 is not damaged.

Experimental results are presented below. The various parameters in these experiments have been chosen for practical reasons.

In an experiment related to the optimization of the thickness of the metal layer 30, a Nd:YAG laser system (Propulse™) delivering 1 J at a wavelength of 0.53 µm and pulse duration of 6 ns, with a repetition rate of 10 Hz, was focused by a lens of focal length 50 cm on a target at normal incidence in air. The laser beam diameter was 1 cm and the intensity distribution in the target plane was flat top. The transparent layer 20 was a borosilicate glass BK7. The metal layer 30 was a thin solid aluminum layer of a thickness varying in the range between about 0 and about 50 μm. The projectile 50 was a solid pure cylindrical aluminum disc of a surface of 1 cm² and a thickness of 1 mm. The momentum transferred to the disc was deduced from the measurement of the ballistic trajectory of the accelerated disc.

Figure 5:
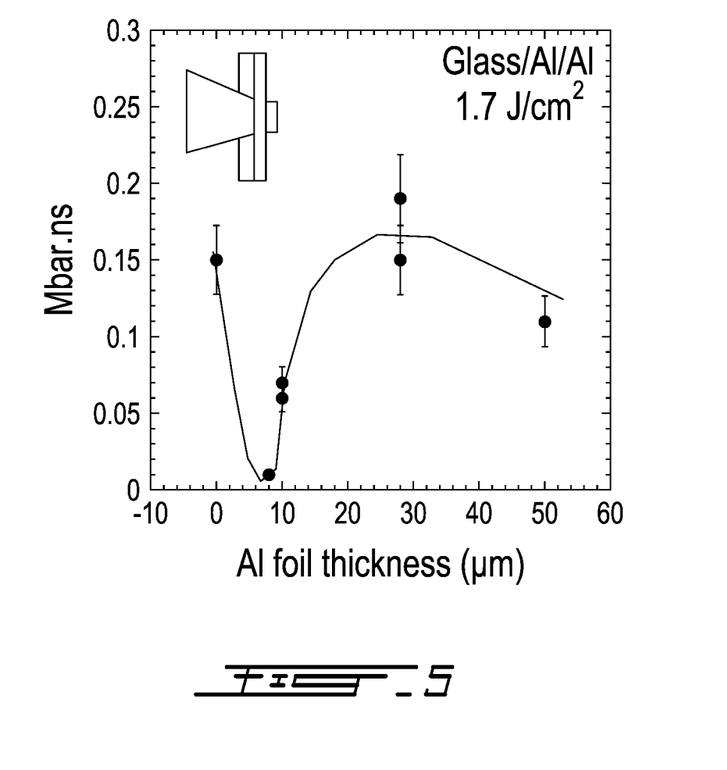
FIG. 5 shows the measured momentum per unit surface (Mbar·ns) transferred to a solid aluminum target as a function of the aluminium layer thickness for a laser fluence (1.7 J/cm$^2$) below the ablation threshold.

FIG. 5 shows measured momentum per unit surface (Mbar·ns) transferred to the projectile 50 as a function of the thickness of the aluminum layer 30 and for a laser fluence of 1.7 J/cm², corresponding to a laser intensity of 0.25 GW/cm². An optimized momentum transfer is observed for a thickness of the aluminum layer 30 in the range between about 20 and about 30 μm. It can be calculated [16] that, in these conditions, the absorption is 50% and the conduction length is 7 μm. Below a thickness of the aluminum layer 30 of 10 μm, a low momentum transfer is observed, which could be due to an increase of the temperature of the aluminum layer 30 above fusion threshold and eventually vaporization threshold, inducing a dramatic decrease of absorption and of the related pressure.

Figure 6:
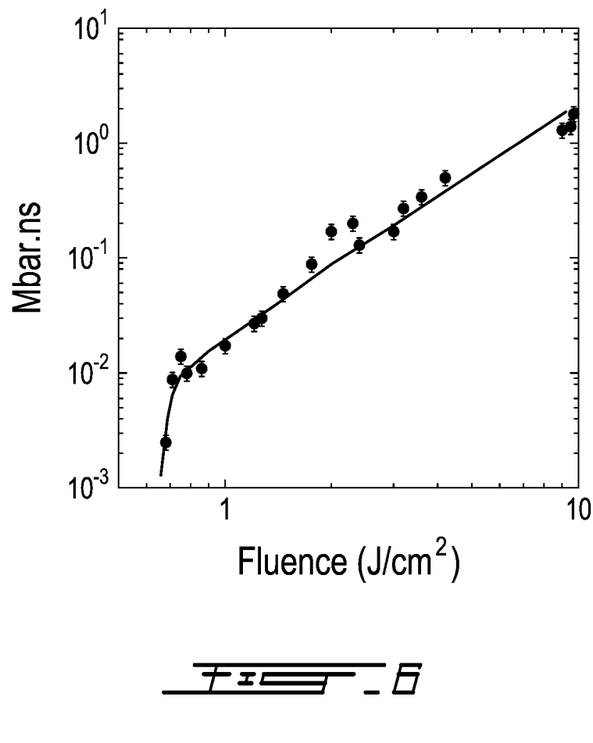
FIG. 6 shows the measured momentum per unit surface (Mbar·ns) transferred to a solid density aluminum cylinder in a confined mode as a function of the laser fluence (Al layer thickness 28 µm)

FIG. 6 shows measured momentum per unit surface (Mbar·ns) transferred to a solid density aluminum cylinder as the projectile 50, in a confined mode, with an optimized thickness of the thin aluminum layer 30 of 28 μm, as a function of the laser fluence. A low fluence threshold is observed at 0.6 J/cm², corresponding to a laser intensity of 0.09 GW/cm². The momentum increases as the fluence increases as expected and in agreement with published data. Momentum around 2 Mbar·ns measured at 10 J/cm² is consistent with previous published results obtained with solids [5-7] in the plasma regime, indicating that the plasma ablation effect dominates over the thermal generation of stress wave at very high fluence.

A second set of experiments related to the use of a pre-compacted powder layer 40 to increase the momentum transferred at low fluence. A Nd:YAG laser system (Surelyte™) delivering 330 mj at the wavelength of 1.06 μm and pulse duration of 10 ns, with a repetition rate of 10 Hz, is focused by a lens (f=50 mm) on a target 50 at normal incidence. The laser beam intensity distribution in the target plane was Gaussian. The transparent layer 20 was a borosilicate glass BK7 layer. The metal layer 30 was a 20 μm thin aluminum layer (solid density). In a first experiment, the pre-compacted powder layer 40 and the projectile 50 were a same layer, i.e. The projectile 50 was a cylindrical disc of pre-compacted porous aluminum powder, having a surface of 1 cm² and a thickness of 1 mm, with a 80% pre-compaction rate achieved with a mechanic press and pressure around 1 gpa.

Figure 7:
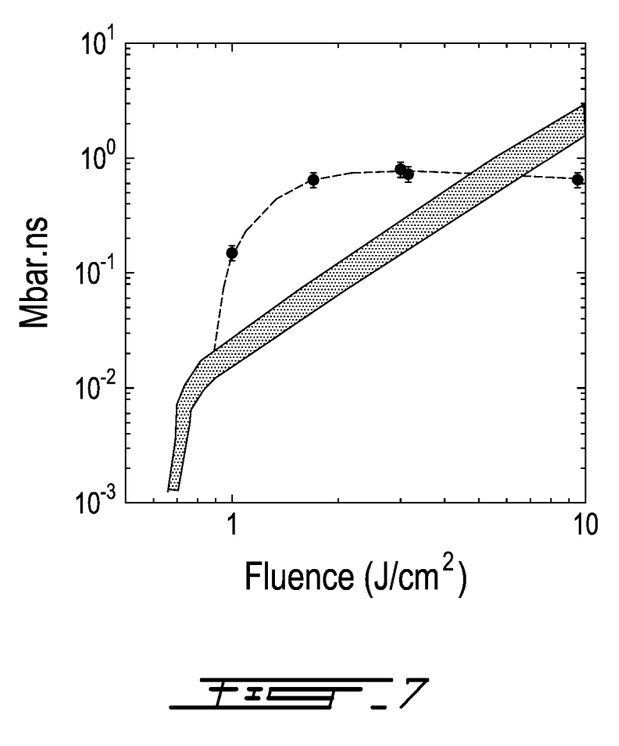
FIG. 7 shows the measured momentum per unit surface (Mbar·ns) transferred to a pre-compacted porous aluminum disc in a confined mode as a function of the laser fluence (Al layer thickness 20 µm), the zone grey representing a trend obtained with solid targets (FIG. 5)

The focal spot diameter was varied at constant laser energy to adjust the laser fluence on the target between 1 J/cm² and 10 J/cm². It should be noted that, for practical reasons, in these experiments, the diameter of the projectile 50 was larger than the laser focal spot diameter. The momentum transferred to the projectile 50 was deduced from the measurement of the ballistic trajectory of the accelerated projectile 50. FIG. 7 shows the measured momentum per unit surface (Mbar·ns) transferred to the pre-compacted powder projectile 50 as a function of the laser fluence (0.5 J/cm²-10 J/cm²). With the pre-compacted powder projectile, a maximum momentum transfer (0.8 Mbar·ns) is observed for fluences between about 2 J/cm² and about 3 J/cm², corresponding to intensity between about $1\times10^8$ w/cm² and about $2\times10^8$ w/cm² (1-2 GW/cm²). A saturation effect is observed for the momentum transferred to the pre-compacted powder projectile at high fluence (9.5 J/cm²) and is attributed to a competition between the thermal effect of the cavity (C) discussed hereinabove and the plasma generation. The momentum drastically decreases for fluence below 1 J/cm² to the level obtained with a solid projectile and this is attributed to a decrease of the cavity effect, the size of the cavity (C) being too small, due to a pressure too low to move the powder grains at these fluences and laser wavelength.

Different types of transparent layer 20, such as Plexiglas, Pyrex, glass and BK7 for example, were tested and the results were independent of the nature of this transparent confinement layer. Similar results were also been obtained at 2 J/cm² with a pre-compacted powder layer 40 having a 1 cm² surface, a 100 μm thickness and a 80% pre-compaction decoupled from the projectile 50 as a cylindrical disc of 80% pre-compacted aluminum powder having a surface of 1 cm² and a thickness of 1 mm, positioned behind the pre-compacted layer 40.

Figure 8:
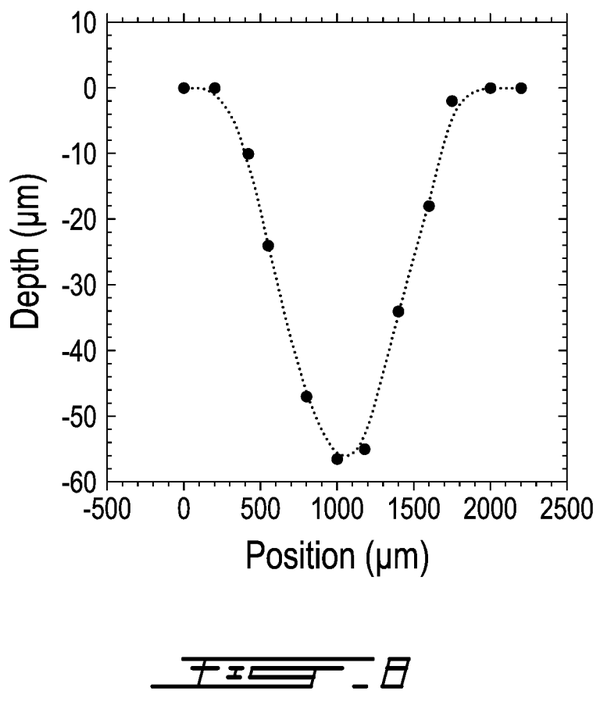
FIG. 8 presents the compaction effect in the pre-compacted powder due to the shock propagation at fluence of 4.5 J/cm$^2$ with a Gaussian pulse; the radial compaction profile is obtained with a 80% pre-compacted powder and the aluminum layer thickness is 20 µm.
Figure 9:
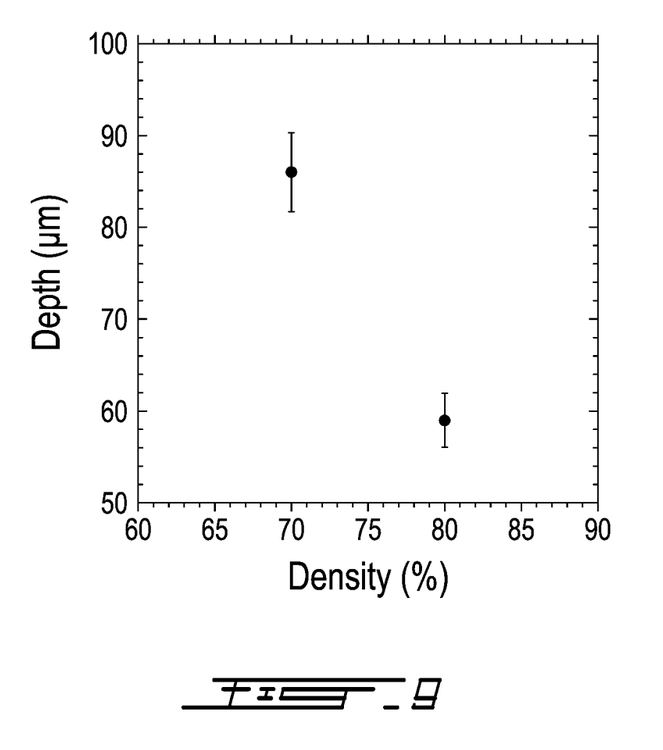
FIG. 9 shows the effect of the pre-compaction density on the compaction maximum depth (fluence of 4.5 J/cm$^2$ and aluminum layer thickness 20 µm)
Figure 10:
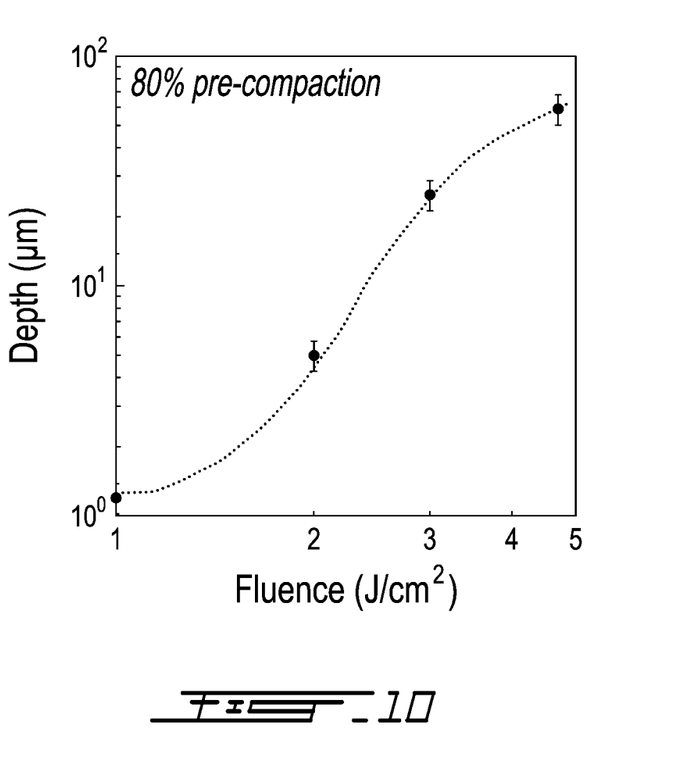
FIG. 10 shows the cavity depth, for a 80% pre-compacted porous powder, as a function of the laser fluence (20 µm aluminum layer); the dotted line is to guide the eye; the data at 1 J/cm$^2$ is at the limit of resolution (1 µm) of the depth measurement method.

The energy transferred to the system composed of the pre-compacted powder layer 40 and the projectile 50 is divided into work done on the material thereof and kinetic energy. In a low mass density material, this results in a compaction of a fraction of the pre-compacted layer 40 and in acceleration of the total mass of the projectile 50. The shock wave passing through the pre-compacted porous layer 40 densifies the powder, the powder grains being pushed forward of the wave under the pressure thereby creating a cavity. FIG. 8 illustrates this effect by showing the shape of the cavity (C) produced in one laser shot and with a fluence of 4.5 J/cm², at the surface of a pre-compacted projectile, in case of an aluminum layer 30 of a thickness of 20 μm. The radial cavity profile observed is related to the radial laser intensity profile, which was Gaussian in this case, and thus to the radial pressure profile, in the focusing plane. The maximum cavity depth is a function of the laser fluence and of the pre-compaction ratio of the powder in which the cavity effect is created. The cavity is larger for lower pre-compaction density of the powder as shown in FIG. 9 indicating that the thickness of the pre-compacted porous layer 40 needs to be less than 100 μm and can be adjusted as a function of the laser parameters. In addition the cavity depth increases with the laser fluence as indicated by the profile observed in FIG. 8 and as shown in FIG. 10. Motion of the powder grains is triggered above a pressure threshold, which is about 1 J/cm² with the present parameters. This explains why the measured momentum in FIG. 7 drops rapidly when the fluence is below 1 J/cm².

The acceleration performance of the method, and the operating fluence window, can be optimized by adjusting the parameters, in particular by controlling the pre-compaction density or porosity of the intermediate pre-compacted porous layer 40 in which the cavity effect is created, by selecting the material for the metallic layer 30, such as aluminum, copper, iron stainless steel, and of the porous layer 40 in order to increase the pressure in the porous layer 40 by shock impedance matching increasing the cavity depth, by increasing the pulse duration in order to increase the heating in the metallic layer 30 and the compaction piston effect, by increasing the laser wavelength and using, as an example, a NaCl transparent layer 20 in conjunction with a $CO_2$ laser pulse at 10 μm wavelength in order to modify the ablation parameters, and by controlling the laser intensity profile to achieve a flat top profile. As an example, a pre-compacted porous aluminum disc with 80% of compaction having a diameter of 2 mm and a thickness of 300 μm can be accelerated at a velocity larger than 100 m/s with a fluence of 2 J/cm², 10 ns pulses, 1 μm wavelength, 25 μm aluminum layer 30 and a 100 μm thick pre-compacted aluminum layer 40 with 80% of compaction.

There is thus provided a method comprising heating a metal layer with laser pulses below the liquefaction and ionization thresholds of the metal, resulting in the creation of a hot cavity in a low density layer in direct contact with the metal layer, the cavity expanding and generating a high pressure wave within the low density layer, this high pressure wave in turn accelerating a low mass density projectile, i. E. In a range between about 1 $g/cm^3$ and about 5 $g/cm^3$, in direct contact with the low density porous layer to high velocities, depending of the weight of the projectile, i.e. of up to about 100 m/s for a projectile of a weight of 2 mg for example, this accelerated projectile being thus usable as an impact projectile on a given surface.

The low mass density projectile may be made of compacted powders, low porosity material, array of micro-dots, or foams for example. It may be fabricated by direct 3D printing on a transparent membrane or by surface patterning with femtosecond lasers or array of many dots disposed in 3D with a well-controlled porosity for example.

The method can be used to optically accelerate and utilize projectiles having a non-uniform composition, which can be obtained by mixing and pre-compacting powders of different low atomic numbers materials.

The method can also be used to accelerate ultra-small masses, i.e. Projectiles of a volume in a range between about 1 $\mu m^3$ and about 1000 $\mu m^3$, of low atomic number, i.e. In the range between about 1 and about 10, material to very high velocities without ionization or ablation.

A potential application is the use of a cold ultra-small mass projectile inside an optical system, which could focus a very high peak power. I.e. In a range between about 1 PW and about 10 PW, femtosecond laser system at very high intensity, i. e. An intensity of at least $10^{23}$ $W/cm^2$, so that the projectile arrives with a controlled timing at the focal spot of the optics to be used as a localized target, giving the possibility to achieve laser-matter interaction at ultra-high intensity, i.e. Intensity of at least $10^{23}$ $W/cm^2$, without requiring any mechanical target support, with controlled temporal synchronization between the arrival of the target and the arrival of the high peak power laser pulse, and with controlled localization of the ultra-high intensity laser-matter interaction and processes.

The method can also be applied with any kind of laser repetition rate used with any kind of focusing optics, including high numerical aperture (HNA) focusing geometry.

The method extends the range of applicability of the laser-driven method to a non-plasma acceleration regime obtained with lower laser fluence, which is particularly convenient for the use of lower energy laser systems with higher average power or for acceleration without damages of low mass density and low thermal conductivity materials, either compacted powders, low porosity material, array of micro-dots.

There is thus provided a method and a system comprising isochoric heating at the interface between a transparent layer and a first metal layer, generating a shock wave which builds up and propagates through this first metal layer. A second layer, behind the metal layer, is a pre-compacted powder layer, which compacts and deforms under action of the shock wave. This deformation creates a hot cavity between the first metal layer and the pre-compacted powder layer, which subsequently cools and expands adiabatically. This adiabatic cooling produces momentum enhancement, compared to a situation without a pre-compacted powder layer, and accelerates a projectile positioned behind the pre-compacted powder layer.

The scope of the claims should not be limited by the embodiments set forth in the examples, but should be given the broadest interpretation consistent with the description as a whole.

REFERENCES

1—ASM Handbook, Volume 5A, Thermal spray technology, ASM international (2013)
2—V. Champagne et al, Modelling Simul. Mater. Sci. Eng. 18 065011 (8pp) doi:10.1088/0965-0393/18/6/065011 (2010)
3—I. Kovaleva et al, Physics Procedia 1, 285-295 (2011)
4—N. C. Anderholm, Appl. Phys. Lett. 16, 113 (1970)
5—C. Phipps et al, J. Prop. Power 26, 609 (2010) and references therein
6—R. Fabbro et al, J. appl. Phys. 68, 775-784 (1990)
7—P. Darquey et al, in Shock wave and high strain rate phenomena in materials, M. Meyers, L. Murr, K. Staudhammer eds, Marcel Dekker in. (1992).
8—J. S. Goela and B. D. Green, "ablative acceleration of small particles to high velocity by focused laser radiation" JOSA B, 3, 8-14 (1986)
9—S. Katz et al, response of composite materials to hypervelocity impact, Int. Journal. Of Impact Engineering, 35, 1606-1611 (2008)
10—T. Kadono et al, Shock Compression of Condensed Matter—2011 AIP Conf. Proc. 1426, 847-850 (201); doi: 10.1063/1.3686410 American Institute of Physics 978-0-7354-1006-0/$0.00 (201)
11—T. Kadono et al, "Impact experiments with a new technique for acceleration of projectiles to velocities higher than earth escape velocity of 11.2 km/s", J. of Geophysical research, 115, E04003, 9 pages (2010)
12—O. Uteza et aluminium «Surface ablation of dielectrics using sub10 fs to 300 fs laser pulses: crater depth and efficiency as a function of the laser intensity» Journal of Laser Micro-NanoEngineering, 5, 3 (2010).
13—N. Sanner et al, Towards determinism in surface damaging of dielectrics using few cycle laser pulses, Appl. Phys. Lett. 96, 071111 (2010).
14—A. Rubenchik et al, WO 2013/039609 (21 Mar. 2013).
15—N. Zhang et al, "Investigation of ultrashort pulse laser ablation of solid targets by measuring the ablation generated momentum using a torsion pendulum" Optics express, 19, 8870-8878 (2011).
16—J-C. Kieffer et aluminium IEEE J. Quantum Electronics 25, 2640 (1989)

The invention claimed is:
1. A system, comprising:
a metal layer having a first surface and a second opposite surface; a porous layer having a first surface and a second opposite surface; the porous layer being positioned with the first surface thereof in direct contact with the second surface of the metal layer, and a projectile, said projectile being positioned on the second surface of the porous layer; and
a laser source;
wherein said laser source is selected to irradiate the first surface of the metal layer with laser pulses of a fluence between 1 $J/cm^2$ and 3 $J/cm^2$ to temperatures below the liquefaction and ionization thresholds of the metal, thereby generating a pressure wave in the metal layer; the pressure wave propagates and compacts pre-compacted powder of the porous layer, thus creating a cavity; and the cavity transfers momentum to the projectile.

2. The system of claim 1, wherein a thickness of the metal layer is selected with a thickness in a range between 1 µm and 50 µm and a thickness of the porous layer in a range between 10 µm and 100 µm.

3. The system of claim 1, wherein said laser source is selected to emit pulse beams of a duration in a range between 10 ps and 50 ns at the fluence in the range between 1 J/cm$^2$ and 3 J/cm$^2$.

4. The system of claim 1, wherein said target comprises a transparent layer at the first surface of the metal layer irradiated by said laser source.

5. The system of claim 1, wherein said target comprises a transparent layer at the first surface of the metal layer irradiated by said laser source, said metal layer having a thickness in a range between 1 µm and 50 µm, said porous layer having a thickness in a range between 10 µm and 100 µm and said transparent layer having a thickness in a range between 500 µm and 1 cm.

6. The system of claim 1, wherein the pre-compacted powder is selected with a selected pre-compaction density.

7. The system of claim 1, wherein the metal layer and the porous layer are in materials selected for shock impedance matching.

8. The system of claim 1, wherein the porous layer is part of the projectile.

9. The system of claim 1, wherein the projectile is an array of micro-dots.

10. The system of claim 1, wherein the projectile is a foam.

* * * * *